United States Patent [19]

Holeman

[11] Patent Number: 4,596,014
[45] Date of Patent: Jun. 17, 1986

[54] I/O RACK ADDRESSING ERROR DETECTION FOR PROCESS CONTROL

[75] Inventor: James E. Holeman, Plano, Tex.

[73] Assignee: Foster Wheeler Energy Corporation, Livingston, N.J.

[21] Appl. No.: 581,629

[22] Filed: Feb. 21, 1984

[51] Int. Cl.[4] .............................................. G06F 11/10
[52] U.S. Cl. ...................................................... 371/49
[58] Field of Search .............................. 371/49, 51, 37

[56] References Cited

U.S. PATENT DOCUMENTS

| | | | |
|---|---|---|---|
| 3,245,040 | 4/1966 | Burdett et al. | 371/49 |
| 3,270,318 | 8/1966 | Strawbridge | 371/51 |
| 3,585,378 | 5/1971 | Bouricius | 371/51 |
| 3,599,146 | 8/1971 | Weisbecker | 371/51 |
| 3,735,351 | 5/1973 | Macheel | 371/37 |
| 3,789,204 | 1/1974 | Barlow | 371/51 |
| 3,914,741 | 10/1975 | Bonser et al. | 371/49 |
| 4,244,049 | 1/1981 | York et al. | 371/38 |
| 4,271,519 | 6/1981 | Hall | 371/38 |
| 4,271,521 | 6/1981 | Mahmood | 371/51 |
| 4,304,001 | 12/1981 | Cope | 371/8 |

Primary Examiner—Charles E. Atkinson
Attorney, Agent, or Firm—Marvin A. Naigur; John E. Wilson; Richard L. Aitken

[57] ABSTRACT

In an industrial process control system, in which the process is controlled via multiplicity of I/O data points communicating with a computer system controller, errors in the addressing signals selecting the I/O data points are prevented from causing the incorrect setting or reading out incorrect data from wrongly selected data points. A multibit parity signal is generated from the address signals as presented at the output of the computer controller and this parity signal is compared with a second multibit parity signal generated from the address signals as applied to the I/O racks on which the I/O data points are organized. If the parity signals don't compare, the change of the setting of or the read out of valid data from the I/O data point selected by the address signal is prevented. A strobe error detection system is provided in which a strobe pulse applied from the computer system controller to the I/O racks is routed back to the computer system controller where it is compared with the strobe pulse at the output of the computer system controller. The voltage level of the routed back signal is sensed at the leading edge of the strobe pulse at the output of the computer system controller and at the trailing edge of this strobe pulse. If the voltage levels of the routed back signal are not correct, an alarm signal is generated to indicate strobe error.

9 Claims, 5 Drawing Figures

I/O RACK ADDRESSING ERROR DETECTION FOR PROCESS CONTROL

BACKGROUND OF THE INVENTION

In computerized industrial control systems, digital signals are applied to and received from a large number of input and output points, called I/O data points, by the computer control system to effect control over the process. Output data points are set in accordance with the applied signals and effect control functions in the process in accordance with the setting of the output data points. Input data points are set in accordance with the detected parameters of the process and the computer control system receives information as to the state of the process in accordance with the setting of these input data points. The I/O data points are organized on I/O cards mounted on I/O racks. Errors in the input and output data signals received from and applied to the I/O data points are prevented by representing the binary bits transmitted between each I/O data point and the computer control system by complementary signals, in which a binary one is represented by a high signal on a first signal line and a low signal on a second signal line and a binary zero is represented by a low signal on the first line and a high signal on the second line. When the data signals are not complementary, this condition is detected as an error. In addition, non-complementary data signals applied to an output data point will cause no change in the output data point and non-complementary signals received by the computer system from an I/O data point are not accepted by the computer as representing the state of the I/O data point.

SUMMARY OF THE INVENTION

In order to apply a data signal to or receive a data signal from an I/O data point, the computer control system applies a ten bit address signal to the I/O racks where the address signal is decoded to select an I/O data point for the data signal to be applied to or received from by the computer control system. The present invention recognizes that in such an industrial control system there is a critical need to detect errors in the addressing signals, which select the I/O data points, so as to prevent an incorrect address signal from selecting the wrong I/O data point and causing the wrongly selected data point to be incorrectly changed in state or to cause incorrect data to be received from the wrongly selected I/O data point.

In the above-described control system, to effect a change of state of an I/O data point in accordance with an applied data signal, a strobe signal is applied to the I/O racks and the state of the I/O data point is changed in accordance with the data signal applied to the I/O data point in response to the strobe signal or in some cases is read out from the I/O data point in response to the strobe signal. The present invention also recognizes that there is a need to detect any strobe signal malfunction on the I/O data racks and to prevent the readout of incorrect data from the I/O data points when the strobe is malfunctioning.

The computer control system employs a microprocessor, called a real time executor to apply the data signals, the address signals, and the strobe signals to the I/O racks over a ribbon cable. In accordance with the present invention the ten bit address signals applied to the ribbon cable are applied to a parity generator, which generates a modified five bit Hamming parity code in accordance with the address bits received from the real time executor. This five bit parity code is applied on its own separate five channels in the ribbon cable to the I/O racks. In each of the I/O racks the ten address bits are again converted to the modified Hamming code and compared with the parity bits received over the ribbon cable. If the bits are not identical, this indicates an addressing error and the data signal accompanying the address signal is prevented from setting the I/O data points or being recognized by the real time executor as a valid data signal by causing both complementary signals representing the binary data bit to be the same. In addition, the strobe signal is blocked from being applied to the I/O card and an alarm signal is generated and applied to the real time executor to indicate to the computer system that an addressing error has occured. In this manner, addressing errors are prevented from causing wrongly selected I/O data points from being incorrectly set to the wrong state and incorrect data from being read out from wrongly selected data points.

To prevent errors caused by a malfunctioning strobe, the strobe signal applied to the I/O data racks is routed back over the ribbon cable to a strobe error detector, in which it is compared with the strobe signal applied to the ribbon cable by the real time executor. The routed back strobe signal is called the strobe check signal. The strobe signal is a normally high signal and changes to a low signal for 400 nanoseconds and then changes back to a high level signal, and it takes approximately 100 nanoseconds for the strobe signal to travel through the ribbon cable to the I/O racks and then be routed back to through the ribbon cable to the strobe error detector. If the strobe is not malfunctioning, the strobe check signal will be high when the strobe signal at the real time executor changes to a low level and will be low when the strobe signal applied to the strobe error detector changes to a high level. The strobe error detector checks these two conditions of the strobe check signal and if either one is not present it forces a complement error in any data signal being received by the real time executor from a I/O data point and applies an alarm signal to the real time executor indicating the presence of a strobe error. In this manner when the strobe signal malfunctions it is detected and the readout of incorrect data from an I/O data point is presented as a result of a malfuntioning strobe.

DESCRIPTION OF THE PREFERRED EMBODIMENTS

Figure 1:
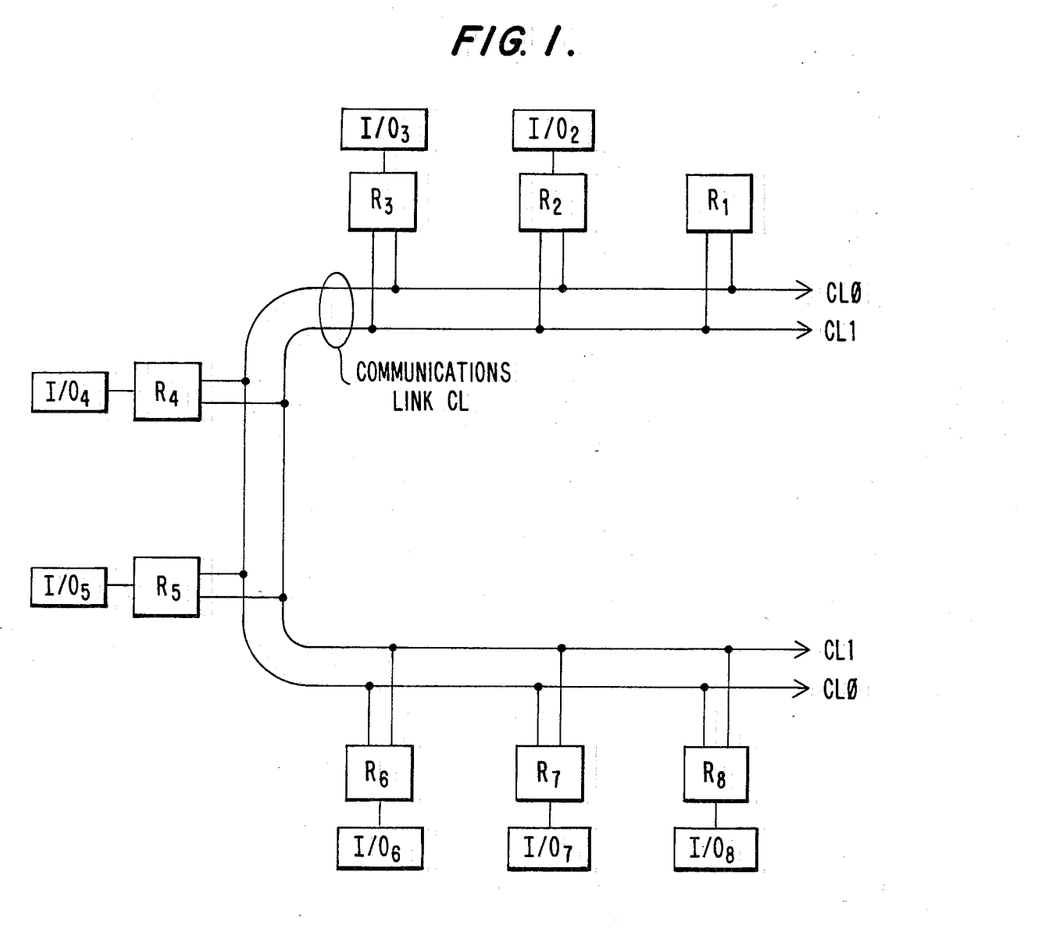
FIG. 1 is an block diagram of an industrial control system of the distributed logic type in which the system of the present invention is employed.

The present invention is employed in an industrial control system like that disclosed in U.S. patent application Ser. No. 482,487 filed Apr. 6, 1983, invented by Billy R. Slater. As described in application Ser. No. 482,487 and as shown in FIG. 1, the system includes a communication link CL having a plurality of remote stations R1 through R8 connected thereto. While, for purposes of illustration, only eight remote stations are shown in FIG. 1, it is to be understood that the system is designed to be used with a much larger number of remote stations. The remote stations R2 through R8 control an industrial process system through input/output devices represented by I/O$_2$ through I/O$_8$, respectively. Each of these remote stations may control a large number of output devices and respond to a large number of input devices and the blocks labeled I/O in FIG. 1 each represent many input and output devices.

The remote station R1 represents the remote station at which a control panel is provided in order to provide operator access and control of the overall system. The remote station R1 is shown without input/output devices, but the remote station R1 may also control input/output devices, if desired. The control panel may be like that disclosed in U.S. Pat. No. 4,396,977 entitled "Industrial Process Control System", filed June 16, 1980 invented by Billy R. Slater and Dennis Simpson. Alternatively, the control panel may be like that disclosed in copending application Ser. No. 253,964 entitled "Combined Mode Supervisory Program Panel Controller Method for an Industrial Process Control System", filed Apr. 13, 1981, invented by Billy R. Slater. The remote stations communicate with each other over the communications link CL in the manner disclosed in U.S. Pat. No. 4,304,001 to Michael E. Cope.

Each of the remote stations R2 through R8 is provided with a primary data processor, which receives information from the input devices and controls the output devices, and a back-up data processor which is operable to take over the control of the input/output devices from the primary processor in the event the primary processor fails. A back-up processor may also be provided at remote station R1 to take over interaction with the control panel should the primary processor at the remote station R1 fail.

Figure 2:
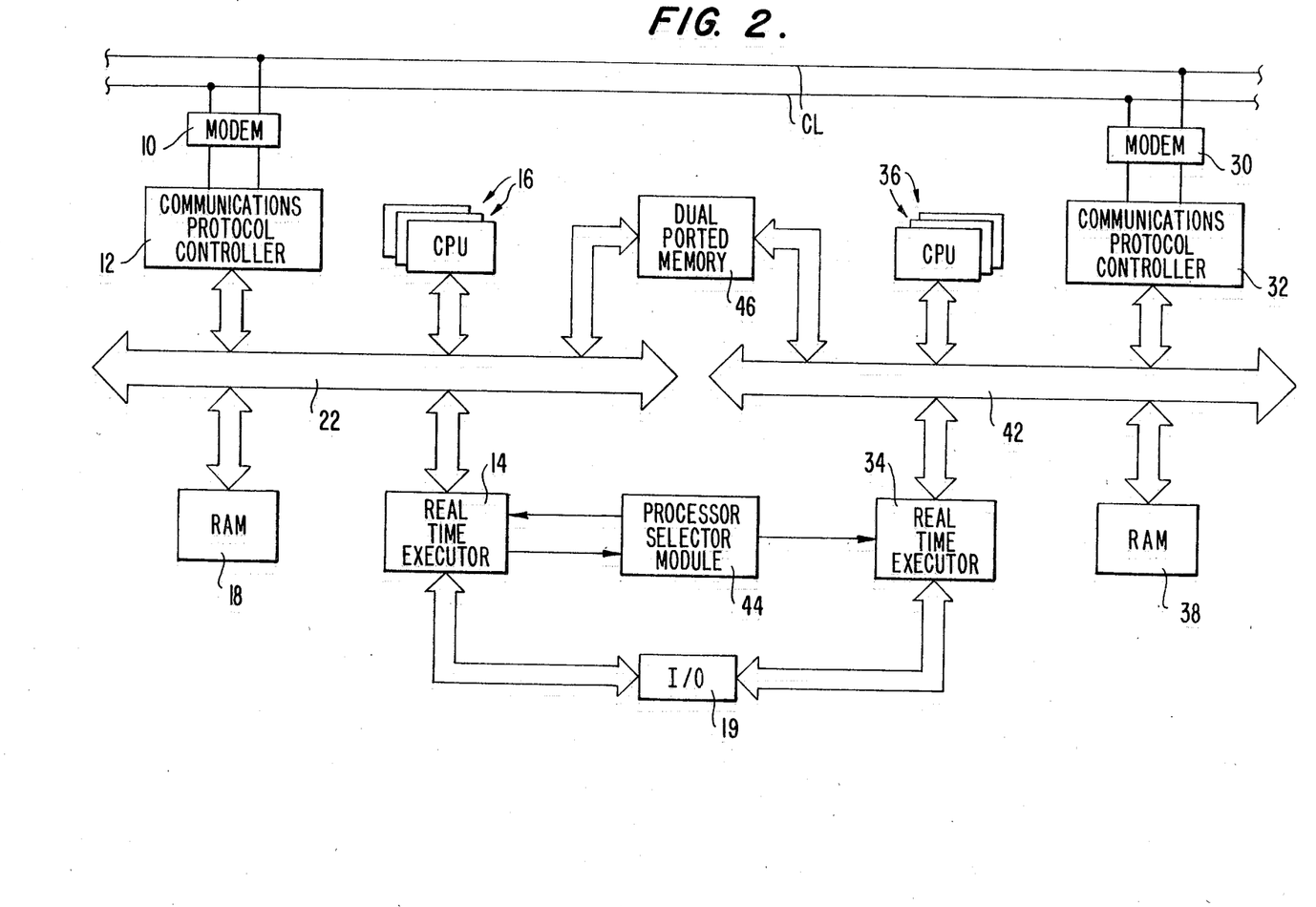
FIG. 2 is a block diagram illustrating the one of the remote stations of the system shown in FIG. 1.

As described in the above mentioned Slater application Ser. No. 428,487 and as shown in FIG. 2, the primary processor at the remote station comprises a modem 10, a communications protocol controller 12, a real time executor 14, one or more central processing units 16, a random access memory 18, and a communications bus 22 which provides addressing, control and information transfer between the devices of the primary data processor. The communications protocol controller 12 comprises a data processing unit and, via the modem 10, interfaces the primary data processor with the communications link CL. The real time executor 14 applies signals to the output devices to control their states in accordance with the determinations made by the primary data processor and receives signals from the input/output devices indicating the states of these input and output devices and, in other words, manages the flow of signals to and from the input/output devices for the primary data processor. The central processor units 16 receive data from the real time executor 14 regarding the status of the input/output devices and also information, directions, or commands from other remote stations via the communications controller 12. Using sequential logic, the central processing units 16 process the data and commands making use of the random access memory 18 and data stored therein and send commands to the real time executor 14 to direct changes in the output devices controlled by the real time executor 14. The sequential logic programs by which the central processing units 16 respond to and control the output devices connected to the real time executor are referred to as applications programs. The details of how protocol controller 12 communicates with the other remote stations via the modem 10 and the communications link CL and the operation of the primary processor in controlling and receiving information from the input and output devices is essentially the same as that described in the above-mentioned Cope U.S. Pat. No. 4,304,001.

At each remote station R2 through R8, there is a back-up processor which is essentially identical to the primary processor and comprises a modem 30, a communications protocol controller 32, a real time executor 34, one or more central processing units 36, a random access memory 38 and a communications bus 42, which are operable to interact with each other and control the input and output devices 19 in the same manner as in the primary procssor. The back-up processor is operable to communicate with other remote stations over the communications link CL via the communications protocol controller 32 and the modem 30 in the same manner that the primary processor can send and receive communications over the communications link. Normally, the back-up processor will be in a back-up mode of operation and will not operate to exercise control over the input/output devices or receive data concerning the states of the input/output devices and the control over the input/output devices is exclusively carried out by the primary processor. In addition, the back-up processor in the back-up mode of operation will not communicate with other remote stations over the communications link. However, should the primary processor fail, the back-up processor then will automatically take over control of and receive the signals and data from the input/output devices 19 and communicate with the other remote stations in the same manner as the primary processor.

The back-up processor, in order to be able to take over operations from the primary processor, has to have an application program or programs which it is capable of exceecuting identical to that of the primary processor. However, since only one of the primary processors and the back-up processor can be active in carrying out the applications program, means must be provided to select one of the two processors, the primary processor, or the back-up processor to be the active processor. This function is carried out by a processor selector module 44 in a manner more fully described in the copending Slater application Ser. No. 482,487. The processor selector module 44 will normally select the primary data processor to be the active processor.

When the primary processor fails, this fact is detected by the real time executor 14. In response to such failure, the real time executor 14 will apply a failover signal to the processor selector module 44 indicating that the primary processor had failed. In response to receiving this signal, the processor selector module 44 will select the back-up processor to be the active processor.

A dual ported memory 46 has one port connected to the communications bus 22 of the primary processor and a second port connected to the communications bus 42 of the back-up processor and is used to periodically transfer a record of the status data relating to the current operation of the applications programs from the random access memory 18 of the primary processor to the random access memory 38 of the back-up processor via the dual ported memory as more fully described in the Slater application Ser. No. 482,487. Should the primary processor fail, the back-up processor will then take over management of the input/output devices 19 making use of and operating on the updated record of status data in the random access memory 38 just as if it had been executing the applications programs all along.

Figure 3:
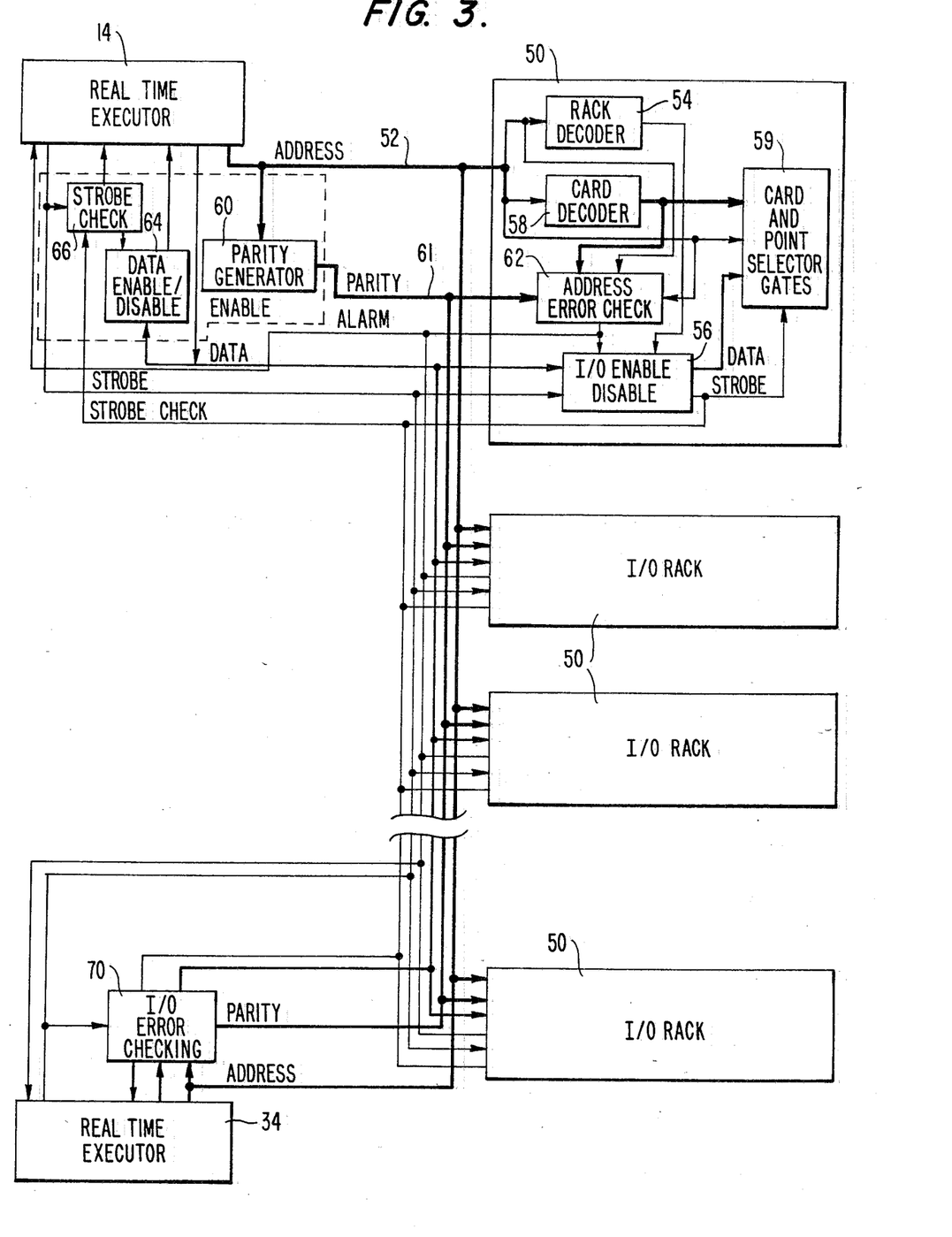
FIG. 3 is a block diagram illustrating the error detection system of the present invention as employed in the remote stations shown in FIG. 2.

As shown in FIG. 3, the input output devices 19 are connected to the real time executors 14 and 34 by means of a set of up to eight I/O racks 50. On each I/O rack 50 there is mounted up to 16 I/O cards, which may be analog cards or digital cards. On each digital card there is provided eight digital I/O data points. The digital I/O data points are each settable to one of two states to represent a binary condition of the process, for example on or off, or open or closed. On each analog card there are four 12 bit registers, each storing an analog value. Thus the analog cards store 48 I/O bits of data. In the case of output data points, the data points control output devices in accordance with the value to which the output data points are set. In the case of input data points, the data points are set to values in accordance with sensed parameters of the process.

As explained above, either the real time executor 14 or the real time executor 34 will be in control of the input output devices depending upon whether the primary data processor or the backup data processor is active. The system will be described on the assumption that the primary data processor is active, it being understood that when the backup data processor is active, the real time executor 34 will operate in coaction with the I/O racks 50 in the same manner as the real time executor 14 of the primary data processor.

As shown in FIG. 3, the real time executor 14 is connected to each of the I/O racks 50 over ten bit address signal lines 52 through a ribbon cable connector. Three of the ten bits are used to select one of the I/O racks 50, another four bits are used to select an I/O card mounted on a selected rack 50, and another three bits are used to select an I/O data point on the selected card. In FIG. 3 the details of only one of the I/O racks is illustrated since the circuitry on each of the racks 50 will be essentially the same. On each I/O rack, the three rack selecting bits of the address are applied to a rack decoder circuit 54, which if the I/O rack is selected, will apply a rack enable signal to an I/O enable/disable circuit 56. Three of the four card selecting bits of the ten bit address are applied in each I/O rack 50 to a card decoder circuit 58, which will generate a card enable signal on one of eight output lines depending on the three card selecting bits of the address and the card enable signal will act to select two of the 16 I/O cards mounted on the I/O rack 50. The fourth card selecting bit selects one of the two cards selected by the card enable signal. The three point selecting bits of the address are applied to the I/O cards, and the card enable signal, the fourth card selecting bit together with the three point selecting bits are applied to gates (represented in FIG. 3 by block 59) on the selected card to select one of the eight I/O data points on the selected card. The I/O enable/disable circuit enables valid data to be transferred to or from the selected card on the selected I/O rack 50 in a manner to be described below.

In accordance with the present invention the ten bit address signals coming out of the real time executor in addition to being applied to the address signal lines in the ribbon cable, are applied to a parity generator 60, which is located at the real time executor 4. The parity generator 60 generates a 5 bit modified Hamming code in response to the applied ten bit address. The five parity bits are applied through signal lines 61 in the ribbon cable connector to each of the I/O racks and in each I/O rack are applied to an address error checking circuit 62, which will compare the parity bits with another set of parity bits, which are regenerated from the address bits which are applied to the I/O rack through address lines 52 in the ribbon cable connector. The address error checking circuit 62 receives the rack selecting bits, fourth card selecting bit and the point selecting bits from the ribbon cable 52, and also receives the card enable signal applied to one of the eight output lines of the card decoder 58. In the address error checking circuit 62 the card enable signal is re-encoded into three binary bits corresponding to the original three card selecting bits applied to the card decoder 58. In the address error checking circuit 62, the resulting three card selecting bits together with the fourth card selecting bit, the rack selecting bits, and point selecting bits are then converted to parity bits in the modified Hamming code, which parity bits are compared with the parity bits received from the parity generator 60 over signal lines 61 in the ribbon cable connector. If the parity bits locally generated are the same as those received from the ribbon cable, the address error checking circuit 62 applies an enabling signal to the I/O enable/disable circuit 56.

If an output data point is being set, the I/O enable/disable circuit 56 also receives a strobe signal from the real time executor 14 transmitted through the ribbon cable connector along with each set of address bits and also receives a data signal from the real time executor representing the value to which the selected I/O point is to be set through the ribbon cable connector. If the I/O enable/disable circuit 56 is enabled by the rack enable signal and is also enabled by the address error checking circuit 62, it will pass the strobe signal to the I/O data cards. If the circuit 56 is not enabled by both the rack enable signal and the address error checking circuit 62, it will not pass the strobe signal. When the strobe signal is applied to the selected data point along with an output data signal, the I/O data point will be set in accordance with the data signal. If the output data point is a digital data point, the data signal will be a binary bit representing the state to which the digital data point is to be set and the strobe signal will be a strobe pulse transmitted with the binary bit. If the output data point is an analog data point, the data signal will be 12 binary bits transmitted in series and the strobe signal will be a strobe pulse transmitted with each binary bit.

If the I/O data point is an input data point, an input data signal will be generated to represent the value of the input data point selected by the address bits. If the input data point is a digital data point, the data signal will be a binary bit representing the state of the input data point and it will be generated in response to the address signal selecting the input data point without any strobe signal. If the input data point is an analog data point, a strobe signal in the form of twelve strobe pulses in succession will be used to read the twelve binary bits comprising the input data signal from the register comprising the analog input data point. The input data signal is applied to the I/O enable/disable circuit 56 and if the I/O enable/disable circuit is enabled by the address error checking circuit 62, it will transmit the input data signal back to the real time executor 14 via the ribbon cable connector and then through a data enable/disable circuit 64 located at the real time executor 14. If the address error checking circuit 62 does not apply an enabling signal to the I/O enable/disable circuit 56, then the data signals will be made inoperative to set an output data point or to be received by the real time executor 14 as valid data.

The strobe signal after passing through the I/O disable circuit 56 is rerouted back through the ribbon cable connector to a strobe check circuit 66 located at the real time executor 14. The routed back strobe signal is referred to as strobe check signal. The strobe check circuit 66 also receives the strobe signal coming out of the real time executor 14 before it is applied to the ribbon cable connector. By the time the strobe check signal gets back to the strobe check circuit, it will be delayed by about 100 nanoseconds relative to the original strobe signal applied to the strobe check circuit. Each strobe pulse of the strobe signal is a negative going pulse about 400 nanoseconds wide on a signal line having a normally high signal voltage applied thereto. The strobe check circuit 66 detects the level of the strobe check signal on the leading edge of the strobe pulse in the strobe signal and on the trailing edge of the strobe pulse in the strobe signal. If the strobe signal is functioning properly, the strobe check signal should be high at the time of the leading edge of the strobe pulse and should be low at the time of the trailing edge of the strobe pulse. The strobe check circuit detects whether these conditions occur and if so applies an enabling signal to the data enable/disable circuit 64 and allows any input data signal applied thereto from an I/O rack through the ribbon cable connector to be validly transmitted to the real time executor 14. If the strobe check circuit 66 determines that the strobe check signal is not high at the time of the leading edge of the strobe pulse or is not low at the time of the trailing edge of the strobe pulse, it will apply an alarm signal to the real time executor 14 and also apply a disabling signal to the data enable/disable circuit 64, which will then condition the data to be invalid so as to be recognized as such by the real time executor 14.

The parity generator 60, the enable/disable circuit 64, and the strobe check circuit 66, in combination are called an I/O error checking circuit, which is implemented on a printed circuit board located at the real time executor 14. As shown in FIG. 3, the real time executor 34 has an identical I/O error checking circuit 70 located at the real time executor 34. The real time executor 34 and the I/O error checking circuit 70, which are connected in parallel to the corresponding signal lines in the ribbon cable connector, cooperate with the circuitry on the I/O racks 50 when the backup processor is active in the same manner as described above with respect to the real time executor 14, the parity generator 60, the data enable/disable circuit 64, and the strobe check circuit 66.

Figure 4:
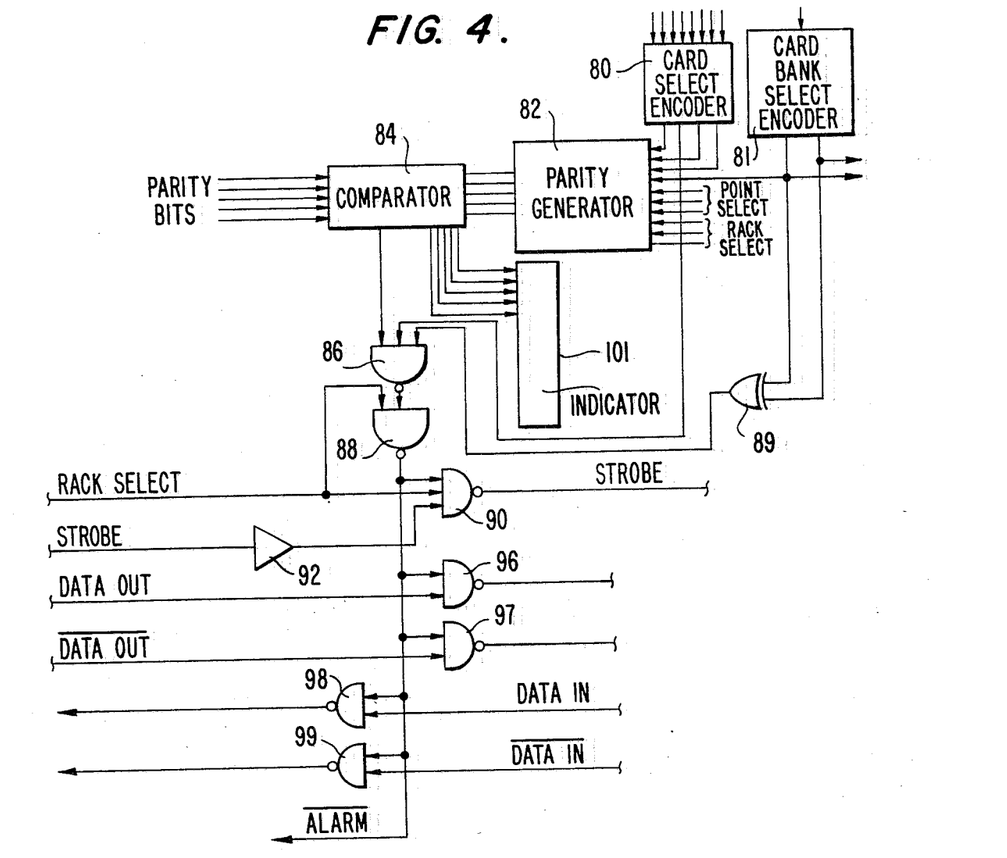
FIG. 4 is a block diagram showing the details of the address error detection system employed on each of the I/O racks of the system shown in FIG. 3.

As shown in FIG. 4 which illustrates the address error checking circuit 62 and the I/O enable/disable circuit 56 in more detail, the eight output lines of the card encoder 58, are applied to a card select encoder circuit 80, which in response to the applied enable signal on one of the lines generate a three bit card selecting code which would produce the card enable signal on the selected line. The three bit card selecting address code is applied to a parity generator 82 along with the three bit rack selecting code and the three bit point selecting code, which are received in the I/O rack from the ribbon cable connector. The fourth card selecting bit is applied to a card bank select encoder 81, which generates two output signals, one of which is the same as the fourth card selecting bit and one of which is the inverse of the fourth card selecting bit. These output signals are used to select the first eight cards or the last eight cards in the rack in accordance with the fourth card selecting bit and in this manner select one of the two cards selected by the card enable signal. The output signal of the card bank select encoder 81 which is the same as the fourth card selecting bit, is applied to the parity generator 82 as a representation of this address bit.

The parity generator 82 generates a five bit modified Hamming parity code in response to the applied ten bit address signal, which modified Hamming parity code should be the same as that generated by the parity generator 60 if the address bits applied to the parity generator 82 are the same as that applied to the parity generator 60. The five bit parity code produced by the parity generator 82 is applied to a comparator circuit 84, which also receives the five bit parity code produced by the parity generator 60 and transmitted to the I/O rack over signal lines 61 in the ribbon cable connector. The comparator circuit 84 compares each parity bit produced by the parity generator 82 with a corresponding parity bit applied to the comparator 84 from the ribbon cable and produces a high voltage level signal applied to a nand gate 86 if all of the corresponding parity bits are the same and produce a low level output signal applied to nand gate 86 if any pair of corresponding parity bits are not the same.

The nand gate 86 also receives a signal from the card select encoder 89 and a signal from an exclusive or gate 80. The card select encoder 80 will apply a high level signal voltage to the nand gate 86 whenever it receives an enable signal on one and only one of eight input lines and will apply a low level error indicating signal to the nand gate 86 when it receives no enable signal on any of the eight input signal lines or an enable signal on more than one input line. The exclusive or gate 89 receives both the output signals from the card bank select encoder 81 and will apply a high level signal to the nand gate 86 whenever it receives a high level signal on either of its two input lines but not both. Thus, unless the card bank encoder erroneously fails to generate complementary output signals, the exclusive or gate 89 will apply a high level signal to the nand gate 86.

The nand gate 86, will produce a low level output signal voltage if all the applied input signals are high and will produce a high level output if any one or more of the applied input signals are low. Thus if the output signals to the nand gate 86 from the card bank select encoder 80 and the exclusive or gate 89 are high, the nand gate 86 will produce a low output if the comparator 84 detects no parity error and will produce a high output if the comparator 84 detects a parity error. Similarly, if either the card select encoder 80 or the exclusive or gate 89 fails to provide a high level signal to the nand gate 86, as a result of an error in the input to the card select encoder or error in the output signals of the card bank select encoder 81, the output of the nand gate 86 will be high. Thus, a high level output of the nand gate 86 indicates an error resulting from a detected parity error, the failure of one and only one enabling signal being applied to the card select encoder, or the failure of the outputs of the card bank select encoder 81 to be complementary. The output of the nand gate 86 is applied to nand gate 88, which also receives the rack select signal produced by the rack decoder 54. The rack select signal will be high when the rack decoder determines that the rack on which the rack decoder is mounted is selected by the rack selecting bits of the address. Accordingly, whenever there is no error as indicated by a low level output signal of the nand gate 86, the output of the nand gate 88 will be high. It will be low whenever the output of the nand gate 86 is high indicating the presence of an error and the rack select signal is present or high.

The output of the nand gate 88 is applied to a nand gate 90, which also receives the rack select signal produced by the rack decoder 54 and the strobe signal after the strobe signal has been inverted by an inverter 92. Each strobe pulse of the strobe signal received from the ribbon cable and applied to the I/O rack is a negative going pulse in a normally high level signal 400 nanoseconds wide. The inverter 92 inverts this negative going pulse of the strobe signal to a positive going pulse which is applied to the nand gate 90. If the output of the nand gate 88 is high indicating no error when the rack decoder 54 produces an enabling high level output signal in response to the I/O rack being selected, then when the positive going strobe pulse is applied to the nand gate 90, it will produce a negative going output strobe pulse duplicating the strobe pulse applied from the ribbon cable connector to the inverter 92. If the rack select signal is low or if the output of the nand gate 88 is low in response to an error, then the output of the nand gate 90 will remain high when the positive going strobe pulse is applied thereto and thus the strobe pulse will be blocked at the nand gate 90 from being passed to the I/O data points of the I/O rack.

The output of the nand gate 88 is also applied to nand gates 96 through 99. The nand gate 96 receives a signal called the DATA OUT signal and the nand gate 97 receives a signal called the $\overline{\text{DATA OUT}}$ signal. The DATA OUT signal and $\overline{\text{DATA OUT}}$ signal represent an output binary bit to be applied to an output data point to set a digital data point in accordance with the value of the binary bit or to be stored in the appropriate stage of the register of an analog data point. If the binary bit is a one then the DATA OUT signal will be high and the $\overline{\text{DATA OUT}}$ signal will be low, and if the binary bit is a zero then the DATA OUT signal will be low and the $\overline{\text{DATA OUT}}$ signal will be high.

A DATA IN signal is applied to the nand gate 98 and a $\overline{\text{DATA IN}}$ signal is applied to the nand gate 99. The DATA IN signal and the $\overline{\text{DATA IN}}$ signal represent the binary bit of data read out from a selected input data point in the same complementary manner that the DATA OUT signal and the $\overline{\text{DATA OUT}}$ signal represent the binary bit to be applied to an output data point. If the output signal from the nand gate 88 is high, the nand gates 96 and 97 will produce the $\overline{\text{DATA OUT}}$ signal and the DATA OUT signal at their outputs and the nand gates 98 and 99 will produce the $\overline{\text{DATA IN}}$ signal and the DATA IN signal at their outputs. However, if the output of the inverter 88 is low, as a result of the comparator 84 detecting a parity error, the outputs of the nand gates 96 through 99 will all be forced high. Thus complementary signals will not be transmitted and accordingly the output data signal will be ineffective to set any output data point and the input data signal received by the real time executor will be detected as invalid data. Thus whenever the output of the nand gate 88 is low, indicating the presence of an error, the strobe pulse will not be transmitted and the data signals will be rendered non-complementary. The output of the nand gate 88 is also transmitted back to the real time executor as an alarm indicating signal, in which a high level signal indicates no alarm and a low level signal indicates alarm.

The five parity bits of the modified Hamming code are generated in accordance with Table 1 below:

TABLE 1

| Parity Bits versus Address Lines | | | | | | | | | | |
|---|---|---|---|---|---|---|---|---|---|---|
|  | A0 | A1 | A2 | A3 | A4 | A5 | A6 | A7 | A8 | A9 |
| CB0 | X | X | X | X | X | X |  |  |  |  |
| CB1 | X | X | X |  |  |  | X | X | X |  |
| CB2 | X |  |  | X | X |  | X | X |  | X |
| CB3 |  | X |  | X |  | X | X |  | X | X |
| CB4 |  |  | X |  | X | X |  | X | X | X |

In this table, the ten address bits are designated A0 through A9. The five parity bits generated in response to the address bits are designated CB0 through CB4. Each parity bit depends upon a unique set of six preselected address bits as indicated by the X's in Table 1. Thus, as shown in Table 1, CB0 depends upon the address bits A0, A1, A2, A3, A4, and A5. The parity bits CB0, CB1, CB3, and CB4 represent even parity; that is the number of ones in the set of address bits plus the parity bit is always even. The parity bit CB2 represents odd parity; that is the number of ones in the set of address bits A0, A3, A4, A6, A7, and A9 plus the parity bit is odd. With this modified Hamming Code, any error in the address bits caused by a change in the address bits between the real time executor and the I/O racks can be detected with a high degree of accuracy. In addition, the pattern of which parity bits do not correspond can be used to indicate where the error probably occured.

The comparator 84 produces 5 output signal bits, called syndrome bits, which result from the comparison of the bits of each corresponding pair of parity bits. The pattern of these syndrome bits will indicate the source of the probable error as shown in Table 2 below.

TABLE 2

| Syndrome Bits versus Probable Signal Failure | | | | | | | | | |
|---|---|---|---|---|---|---|---|---|---|
| S0 | 0 | 1 | 0 | 1 | 0 | 1 | 0 | 1 |  |
| S1 | 0 | 0 | 1 | 1 | 0 | 0 | 1 | 1 |  |
| S2 | 0 | 0 | 0 | 0 | 1 | 1 | 1 | 1 |  |

| S4 | S3 | | | | | | | | |
|---|---|---|---|---|---|---|---|---|---|
| 0 | 0 | 0 | CB0 | CB1 | M | CB2 | M | M | A0 |
| 0 | 1 | CB3 | M | M | A1 | M | A3 | A6 | M |
| 1 | 0 | CB4 | M | M | A2 | M | A4 | A7 | M |
| 1 | 1 | M | A5 | A8 | M | A9 | M | M | M |

In Table 2, the syndrome bits are designated SB0 through SB4. The syndrome bits SB0 through SB4 are generated in response to the comparison of the parity bits CB0 through CB4, respectively. Thus, if the two CB0 bits applied to the comparator 84, one from the ribbon cable, and one from the parity generator 82, are not both the same then the syndrome bit SB0 will be a 1 and if they are the same the syndrome bit SB0 will be a 0. The syndrome bits SB1 through SB4 depend upon the comparison of parity bits CB1 through CB4 respectively in a similar manner. In Table 2, each possible combination of syndrome bits is represented with the different combinations of syndrome bits S0, S1, and S2 being spread horizontally in columns and the different combinations of syndrome bits S4 and S3 being spread vertically in rows. Thus each possible combination of syndrome bits is represented by one entry position in the table at the intersection of the column and row representing that combination of syndrome bits. The symbol in the table at the entry position indicates the probable error which caused the pattern of syndrome bits with the symbol 0 representing no error, the symbol M representing a multiple bit error, the symbols A0 through A9 representing an error in the corresponding address bit and the symbols CB0 through CB4 representing a probable error in the corresponding parity bit. The syndrome bits are applied to an indicator 101 which provides an indication of which syndrome bits, if any, have a value 1 indicating a parity error and thus from the indication provided by this indicator, the source of the error can be predicted.

Figure 5:
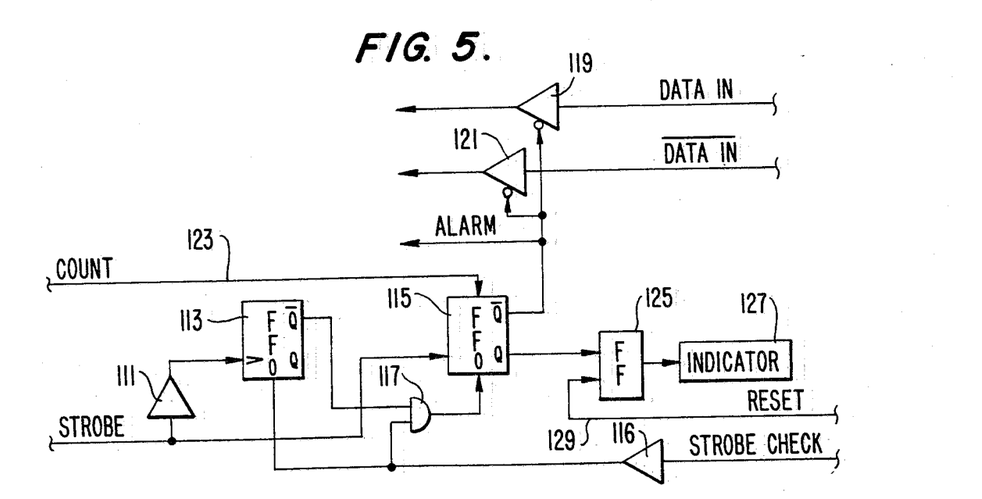
FIG. 5 is a block diagram of the strobe error detection system employed in the system of FIG. 3.

FIG. 5 is a block diagram illustrating circuit details of the strobe check circuit and the data enable/disable circuit 64. As shown in FIG. 5, the strobe signal, which as pointed out above comprises at least one negative going 400 nanosecond pulse, is inverted by an inverter 111 and applied to the clocking input of a flip flop 113 and is applied without inversion to the clocking input of a flip flop 115. The strobe check signal, which should also be a negative going 400 nanosecond pulse delayed by about 100 nanoseconds from the strobe signal, is inverted by inverter 116 and then applied to the data input of the flip flop 113 and to an and gate 117, which also receives a signal from the $\overline{Q}$ output of the flip flop 113. The output of the and gate 117 is applied to the data input of a flip flop 115.

In operation the flip flops 113 and 115 will be set in accordance with the state of the signal applied to the data input at the time of a positive going transition in the voltage level applied to the clocking input. If the signal or voltage level applied to the data input is low at the time of a positive going transition applied to the clocking input, the flip flop will be set so that $\overline{Q}$ is high and Q is low, and if the signal voltage applied to the data input is high at the time of a positive going transition applied to the clocking input, the flip flop will be set in a state in which the $\overline{Q}$ output is low and the Q output is high.

Under normal operating conditions when there is no strobe error, the flip flop 113 will be set in and remain in a state in which the $\overline{Q}$ output is high. At the time of the leading edge of the strobe pulse, the inverted strobe signal applied to the clocking input of the flip flop 113 will be positive going and accordingly, the flip flop 113 at that time will be set in accordance with the inverted strobe check signal. If there is no strobe error, the inverted strobe check signal, at the time of the leading edge of the strobe pulse, should be low so the flip flop 113 will remain in the state in which $\overline{Q}$ is high. If, as a result of strobe error, the inverted strobe check signal should be high at the time of the leading edge of the strobe pulse, the flip flop 113 will be switched to a state in which $\overline{Q}$ is low.

The flip flop 115, when ther is no strobe error, will normally be in a state in which the $\overline{Q}$ output is low and the Q output is high. If no error was detected by the flip flop 113 at the time of the leading edge of the strobe pulse, the $\overline{Q}$ output of the flip flop 113 will apply a high level signal voltage to the and gate 117 at the time of the trailing edge of the strobe pulse. If there is no strobe error at the time of the trailing edge of the strobe pulse, the inverted strobe check signal applied to the and gate 117 should also be high, so the signal applied to the data input of the flip flop 115 should be high at the time of the trailing edge of the strobe pulse if there is no strobe error. Accordingly, at the time of the trailing edge of the strobe pulse, if there is no strobe error, the flip flop 115 should remain in a state in which the Q output is high and the $\overline{Q}$ output is low. If on the other hand a strobe error was detected at the leading edge of the strobe pulse, the flip flop 113 would have been switched to a state in which $\overline{Q}$ is low, in which case the output of the and gate 117 would be low and the flip flop 115 will be switched to a state in which $\overline{Q}$ output is high and the Q output is low. Alternatively, if at the time of the trailing edge of the strobe pulse, the strobe check signal were improperly high, the inverter 116 would be applying a low signal to the and gate 117 and accordingly the output of the and gate 117 would be low at the time of the trailing edge of the strobe pulse regardless of what happened at the leading edge of the strobe pulse. As a result under these conditions, the flip flop 115 would also be switched to a state in which the $\overline{Q}$ output is high and the Q output is low. Thus if errors are detected either on the leading edge of the strobe pulse or on the trailing edge of the strobe pulse, the flip flop 115 will be switched to a state in which the $\overline{Q}$ output is high and the Q output is low.

The signal from the $\overline{Q}$ output of the flip flop 115 is applied to the real time executor as an alarm signal and is also applied as an inhibiting signal to gates 119 and 121, which receive the DATA IN signal and the $\overline{\text{DATA IN}}$ signal, respectively. When the output from the flip flop 115 is low, the gates 119 and 121 will not be inhibited and will transmit the DATA IN and the $\overline{\text{DATA IN}}$ signal. However, whenever the output signal from the $\overline{Q}$ output of the flip flop 115 is high as a result of a strobe error being detected, the gates 119 and 121 will both be inhibited so that the output from both gates are low. Under these circumstances the signals are not complementary and will be received as invalid data by the real time executor.

As pointed out above, the strobe signal is used to read out analog input data points but not digital input data points. When an input data point is a digital data point, the strobe pulse is not used to read out the input data point and the input data signal is generated in response to the address signal alone. In this latter instance, since there is no strobe pulse there can be no strobe error to be detected and the input data signal is validly transmitted through the gates 119 and 121 to the real time executor.

When a strobe error has been detected and the flip flop 115 is accordingly set so that $\overline{Q}$ output is high, the flip flop 115 will remain in this state until the next count pulse is applied thereto over a signal line 123, at which time the flip flop 115 will be set back to its normal state in which the $\overline{Q}$ output is low. The count pulse on signal line 123 will be generated each time the ten bit address signal switches to address a new card. When a strobe error is detected, it is assumed that all of the input data points being read out from a given I/O card will be in error, and accordingly the flip flop 115 will remain in a state to prevent the data signal received by the real time executor from being recognized as valid data. When the address signal addresses the next I/O card, the count pulse will be produced on line 123 to reset the flip flop 115 so that the data read out from subsequent I/O cards is received as valid data. There is no need to reset the flip flop 113 after an error, as the flip flop 113 will automatically be set to the proper state at the time of the leading edge of the next strobe pulse, if the signal applied to the data input of the flip flop 113 is properly low.

Upon a strobe error being detected and the flip flop 115 being switched to a state in which $\overline{Q}$ is high and Q is low, the negative going transition generated at the Q output of the flip flop 115 will cause a flip flop 125 to be set to a state to energize an indicator 127, which thereby indicates the presence of a strobe error. The flip flop 125 will remain in a state to energize the indicator 127 until reset by a manually applied signal on input line 129.

With the system, as described above, addressing errors occuring in the transmission between the real time executor and the I/O racks are effectively prevented from wrongly setting incorrectly selected I/O data points and the readout of data from wrongly selected I/O data points. In addition, malfunction of the strobe signal occurring in the transmission between the real time executor and the I/O data rack is detected and the readout of erroneous data due to a malfunctioning strobe is prevented. In this manner improper control of the industrial process due to addressing errors or a malfunctioning strobe signal are prevented. The above description is of a preferred embodiment of the invention and many modifications may be made thereto without departing from the spirit and scope of the invention.

What is claimed is:

1. A system for detection and prevention of addressing errors comprising a plurality of output data points each settable in accordance with an applied data signal, a computer system, an a multiline connector connected to transmit signals between said computer system and said output data points, said computer system comprising addressing means to generate a multibit address signal and a data signal and to transmit said address signal and said data signal through said connector, data point setting means responsive to an address signal transmitted through said connector from said computer system to select one of said output data points corresponding to the address signal transmitted through said connector and set the selected output data point in accordance with the data signal generated with said address signal and transmitted through said connector, means responsive to the address signal generated by said addressing means before it is applied to said connector to generate a first parity signal, means responsive to the address signal transmitted from said computer system through said connector to generate a second parity signal from the address signal transmitted through said connector, and comparator means to compare said first parity signal with said second parity signal and if said first parity signal does not correspond with said second parity signal to prevent said data point setting means from setting the selected data point in accordance with the data signal generated with said address signal.

2. A system for detection and prevention of addressing errors as recited in claim 1, wherein said data signal comprises at least one binary signal comprising complementary signal voltages, wherein said data point setting means is operable to set an output data point in accordance with said data signal only when the signal voltages of said binary signal are complementary, and wherein said comparator means prevents said data point setting means from setting the selected data point by making said signal voltages comprising said data signal noncomplementary.

3. A system for detection and prevention of addressing errors as recited in claim 1, wherein said computer system further comprises means to apply a strobe signal over said connector to said data point setting means, wherein said data point setting means sets the selected data point in accordance with said data signal in response to an applied strobe signal, and wherein said comparator means prevents said data point setting means from setting the selected data point by preventing said strobe signal from being applied to said data point setting means.

4. An industrial process control system comprising a system for detection and prevention of addressing errors as recited in claim 1, and further comprising means to control the parameters of said process in accordance with the settings of said output data points.

5. A system for detection and prevention of addressing errors in an industrial process control system comprising a plurality of input data points each settable to a value in accordance with a process being monitored, a computer system, a multiline connector connected to transmit signals between said computer system and said input data points, said computer system comprising addressing means to generate multibit address signals and to transmit said address signals through said connector, data point readout means responsive to an address signal transmitted through said connector from said computer system to select one of said data points corresponding to the address signal transmitted through said connector, to read out the selected data point, and to transmit a data signal through said connector to said computer system in accordance with the setting of the selected data point, means responsive to each address signal generated by said addressing means before it is applied to said connector to generate a first parity signal and to transmit said parity signal through said connector, means responsive to the address signal transmitted from said computer system through said connector to generate a second parity signal signal from the address signal transmitted through said connector, comparator means to compare said first parity signal with said second parity signal and, if said first parity signal does not correspond with said second parity signal to prevent said data point read out means from transmitting to said computer system a data signal recognizable by said computer system as a valid data signal.

6. A system for detection and prevention of addressing errors in an industrial process control system as recited in claim 5, wherein said data signal comprises at least one binary signal comprising complementary signal voltages, and wherein said comparator means prevents said data point readout means from transmitting a data signal recognizable by said computer system as a valid data signal by making said signal voltages comprising data signal noncomplementary.

7. A system for detection and prevention of addressing errors in an industrial process control system as recited in claim 5, wherein said computer system further comprises means to apply a strobe signal over said connector to said data point setting means, wherein said data point readout means is responsive to an applied strobe signal to read out the selected data point and to transmit a data signal in accordance with a setting of the selected data point, and wherein said comparator means prevents said data point readout means from transmitting a data signal to said computer system by preventing said strobe signal from being applied to said data point readout means.

8. A computer control system for controlling industrial process comprising a multiplicity of I/O data points, some of said data points being input data points and some of said data points being output data points, said input data points being settable in accordance with the detected parameters of said process, said output data points being settable in accordance with an applied data signal, means to control parameters of said process in accordance with the setting of said output data point, a computer system, a multiline connector connected to transmit signals between said computer system and said I/O data points, said computer system having addressing means to generate multibit address signals each unique to a different one of said I/O data points, said computer means further comprising means to generate an output data signal representing the value to which an output data point is to be set when said addressing means generates an addressing signal corresponding to an output data point and applying said output data signal to said connector, I/O circuit means responsive to addressing signals transmitted through said connector from said addressing means when said address signal corresponds to an output data point to set such output data point to the value corresponding to the output data signal generated with such addressing signal and applied to said connector and, when said addressing signal is unique to an input data point, to transmit over said connector an input data signal representing the value of such input data point to said computer system, means responsive to the address signal generated by said addressing means before it is applied to said connector to generate a first parity signal, means responsive to the address signal transmitted from said addressing means through said connector to generate a second parity signal, comparator means to compare said first parity signal with said second parity signal and if said first parity signal does not correspond with said second parity signal to prevent said I/O circuit means from setting an output data point in accordance with an output data signal or from applying an input data signal to said computer system recognizable by said computer system as a valid data signal.

9. A computer control system as recited in claim 8, wherein said data signals are represented by binary signals each comprising complementary signal voltages, wherein said data point setting means is operable to set an output data point in accordance with said data signal only when the signal voltages of said binary signal are complementary, and wherein said comparator means prevents said I/O circuit means from setting a selected output data point and prevents said I/O circuit means from applying an input data signal recognizable by said computer system as a valid data signal by making said signal voltages comprising said data signals noncomplementary.

* * * * *

UNITED STATES PATENT AND TRADEMARK OFFICE
CERTIFICATE OF CORRECTION

PATENT NO. : 4,596,014

DATED : June 17, 1986

INVENTOR(S) : James E. Holeman

It is certified that error appears in the above-identified patent and that said Letters Patent is hereby corrected as shown below:

On page 1, Item 73, line 6, please delete

"Foster Wheeler Energy Corporation
Livingston, N.J."

and insert in its place --Forney Engineering Company
Carrollton, Texas--

Signed and Sealed this

Twenty-sixth Day of August 1986

[SEAL]

Attest:

DONALD J. QUIGG

Attesting Officer

Commissioner of Patents and Trademarks